Sept. 23, 1924.

J. H. HORSBURGH 1,509,430

FAUCET AND METHOD OF MAKING THE SAME

Filed Oct. 16, 1922     2 Sheets-Sheet 1

INVENTOR
John H. Horsburgh

By Gray and Lilly
Att'ys.

Sept. 23, 1924.  
J. H. HORSBURGH  
1,509,430  
FAUCET AND METHOD OF MAKING THE SAME  
Filed Oct. 16, 1922    2 Sheets-Sheet 2

INVENTOR  
John H. Horsburgh  
By Gray and Lilly  
Att'ys.

Patented Sept. 23, 1924.

1,509,430

UNITED STATES PATENT OFFICE.

JOHN H. HORSBURGH, OF CLEVELAND, OHIO.

FAUCET AND METHOD OF MAKING THE SAME.

Application filed October 16, 1922. Serial No. 594,695.

*To all whom it may concern:*

Be it known that I, JOHN H. HORSBURGH, a resident of the city of Cleveland, county of Cuyahoga, and State of Ohio, and a citizen of the United States, have invented certain new and useful Improvements in Faucets and Methods of Making the Same, of which the following is a specification.

This invention relates to faucets and the method of making the same, and especially to faucets for drawing from containers heavy liquids such as mineral oils, and wherein the time element of discharge is a matter of great importance.

It is a matter of common knowledge that the usual outlet of discharge from the large mineral oil barrels or other containers is substantially uniform, being usually an inch in diameter; and that such containers are filled at the refineries or other sources of supply and very tightly sealed there for shipment by screwing into these outlets solid threaded plugs which are intended to remain therein until the containers are to be emptied at their final destination. At the latter place, the original plugs are removed and valve faucets substituted therefor, so that the rate of flow from such outlet can be accurately controlled.

The object of my invention is to provide a faucet for the purpose which shall yield the maximum speed of flow from such standard outlet, and to accomplish this with the least expense of manufacture and still preserve control of the flow through the faucet by suitable valve.

A further object of my invention is to manufacture said faucet from sheet metal by a series of die-pressing operations, starting with a metal disc, pressing the tube therefrom by successive stages, forming a suitable seat on the interior of the tapered tube thus formed for receiving thereagainst the plunger valve member, and subsequently outwardly pressing a polygonal section for application of a wrench thereto, and ultimately producing a faucet whose minimum interior cross area is as great as that of the pipe section within the container outlet.

The last mentioned result is a desideratum difficult to attain and long sought in the art to which my invention relates. In the usual manner of producing the faucets for this purpose, the formation of the valve seat above recited has constricted the inner aperture of the faucet so much that the product has a reduced effective opening limiting the flow of liquid therethrough to a speed far less than is possible from the container outlet itself; and this undesired effect of the method heretofore employed in manufacture has been thought inevitable to the present time.

Heretofore, given the bore of the container outlet as a fixed factor, there were but two apparent methods of forming the valve seat in the pipe—by crimping the metal inward, when the metal used was quite thin, which step constricted the aperture at that point, as above stated; or by using thicker metal for the wall of the tubing, which directly reduced the effective outlet from the container.

Not only has the step of forming the said seat resulted as explained, but the formation of the nut portion for receiving thereon the wrench for tightening the faucet in the container outlet has also reduced the interior aperture. For example, if the material for making the faucet were $\frac{1}{16}''$ in thickness, the maximum diameter within the outlet portion of the faucet would be $\frac{7}{8}''$. By former methods of manufacture, the diameter of the largest effective opening in said faucet would be $\frac{5}{8}''$ or less, due to the restriction in forming the valve seat, nut portion, or both; and said maximum will be still less if thicker sheet metal be used for the walls of the tube.

As my description proceeds, it will be seen that the smallest diameter within the faucet which is the subject of my invention is $\frac{7}{8}''$—no smaller than that of the interior at the container outlet itself. In other words, the flow of liquid through my faucet is as rapid as it would be through the outlet if the tube section only were secured therein. This has been verified by accurate tests.

The features of the construction of my faucet and my preferred method of manufacturing the same as shown in the accompanying drawings will appear more fully in the description of the same.

In the drawings,—

Figure 17:
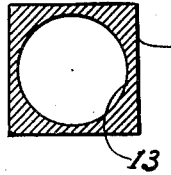
Figure 14:
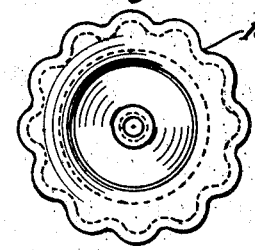
Figure 10:
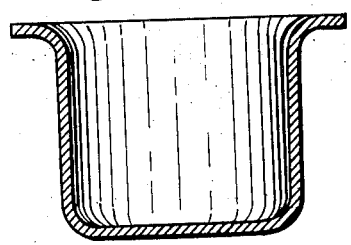
Figure 11:
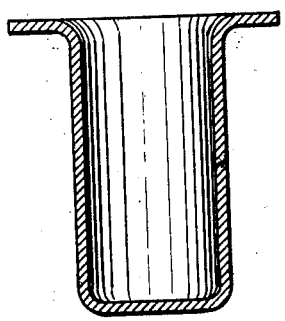
Figure 16:
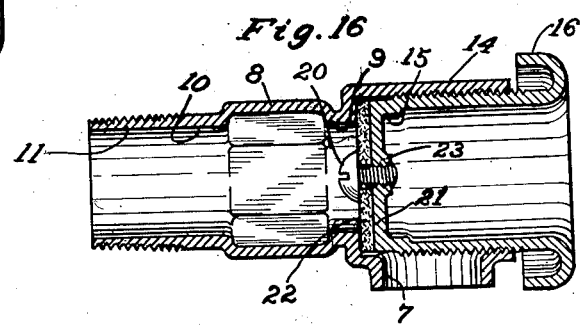
Figure 15:
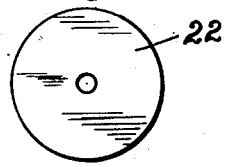

Figures 10, 11, 12, and 13 are central longitudinal sections, respectively, of the successive steps in the method of manufacturing the valve plug or closure when effected by pressing operations;

Figure 14 is an end elevation of the plug or closure;

Figure 15 is a face view of the washer for the plug;

Figure 16 is a central longitudinal sectional view of the faucet body and plug in assembled relation, and Figure 17 is a cross sectional view of the nut portion of the faucet as representing a modified form thereof.

Figure 6:
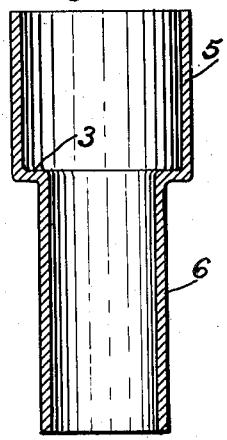
Figure 3:
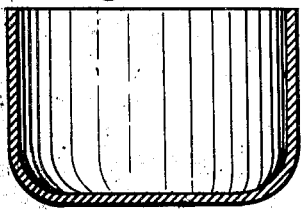
Figure 4:
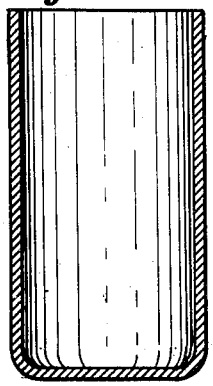

In these drawings in which various parts are designated by the same reference characters throughout the several views, A represents a circular disc of sheet metal, preferably steel though other metals may be used if desired, from which the cup-shaped forms shown in Figs. 3 and 4, respectively, are die-pressed in succession, after which the operation of dies of other contour reduces one end of the cup as at 1 whereby a shoulder 2 is gradually produced which, by the next pressing operation as shown in Fig. 6, becomes more abrupt and forms the valve seat 3 of the final product.

Figure 1:
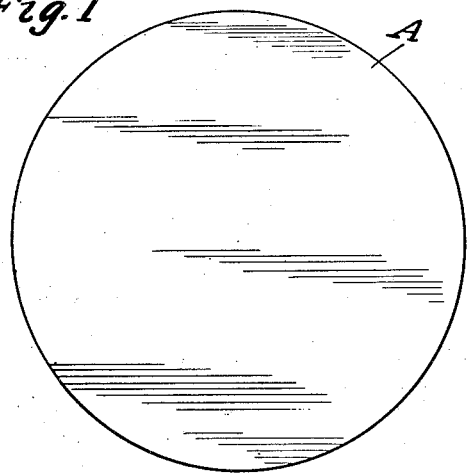
Figures 1 and 2 are plan views of the sheet metal discs from which the faucet and valve plunger parts are to be pressed, respectively.
Figure 5:
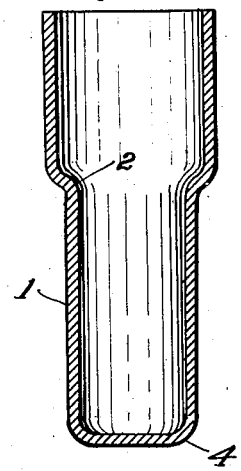
Figures 3, 4, 5, 6, 7 and 8 are central longitudinal sections showing the successive steps in the method of manufacture of the faucet body when made by pressing operations.
Figure 7:
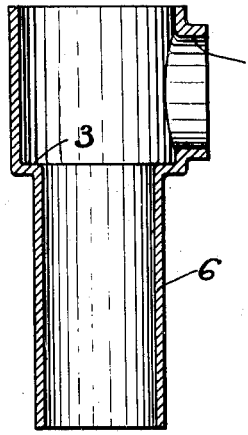

In Fig. 6 the product is shown as modified by the elimination of the extreme end 4 of the part 1 shown in Fig. 5, thus resulting in an irregular tube having large and small ends, 5 and 6, respectively. In Fig. 7, is shown the result of a further pressing operation whereby the nozzle 7 is effected by outwardly punching the wall on one side of the larger end 5 of the tube. The opening in this nozzle will be shown as somewhat elliptical because of the resulting punching or pressing by a circular tool through a cylindrical wall.

Figure 8:
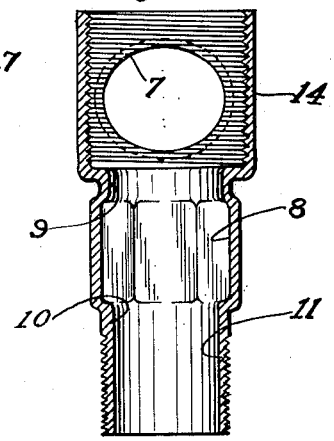
Figure 9:
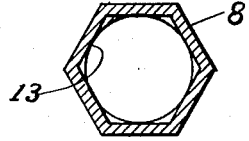
Figure 9 is a transverse section of the faucet taken on a plane intersecting the nut portion.
Figure 2:
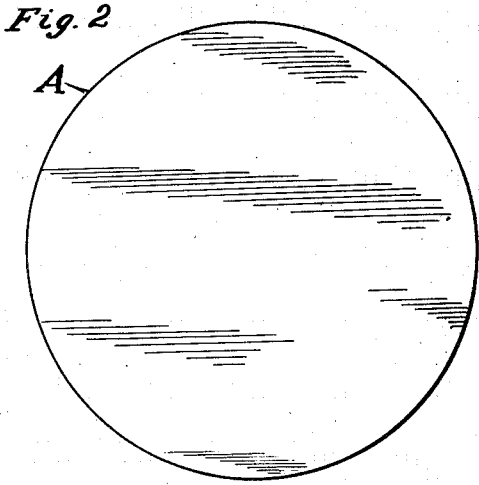
Figure 12:
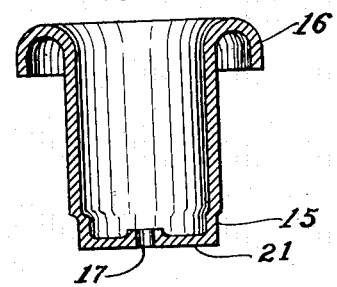

In the view shown in Fig. 8, the final steps in producing the faucet body have been completed, the part 6 of the tube has been expanded by die-pressing to produce the nut portion 8 for grasping by a suitable wrench in screwing the faucet into the container outlet. It is to be especially noted that the latter operation is an outward pressing operation which therefore does not reduce the inner area of the bore of the faucet. By this operation the area of the cross section of the interior of the tube at 9 and at 10 remains no smaller than that of the outlet tube portion 11, and the resulting flow of the liquid from the faucet body will be as rapid as it would be if the section 11 were the only part secured in said container outlet. Such nut portion need not be hexagonal as shown in Figs. 8, 9 and 16, however, but may be square as shown at 12 in Fig. 17, or might be the form of some other polygon, as desired. The essential condition is that the inner bore 13 shall not be constricted. The ordinary and well-known steps of threading the end 11 of the faucet body externally and the end 14 internally are now effected, the former to secure the faucet in the container outlet, and the latter for the reception of the threaded plug or closure.

Figure 13:
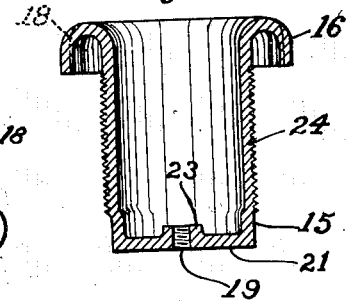

The steps in the process of making the preferred form of plug or closure are quite similar to many of those recited and will now be described. The die-pressing of the disc A into the initial cup forms shown in Figs. 10 and 11 in the order mentioned, is similar to that shown in Figs. 3 and 4 in beginning the faucet formation. The next die used in the pressing operation for the production of the plug slightly reduces the cup at 15, while at the same time the overturned rim portion 16 is effected and the opening 17 is punched through. In Figs. 13 and 14 the fluted form 18 of this rim portion is shown which renders ready rotation of the plug manually.

The opening 17 is now internally theraded at 19 for reception of a screw 20 for detachably securing the washer 22 to the bottom plate or closure 21. It is to be noted that the latter features before described and designated by numerals 15, 16, 18 and also the slightly strengthened annular portion 23, about the opening 19, are all effected by successive die-pressing operations. The body of the plug is now threaded externally at 24 for ready engagement with the interior threads of the part 14. In such assemblage, the washer 22 will seat firmly on the seat or shoulder 3 of the enlarged portion of the faucet body, when the valve is closed. Unscrewing the plug sufficiently will permit almost uninterrupted flow of the liquid from 11 out through the nozzle opening 7.

To recapitulate, the express purpose of my invention is to make a faucet that shall make possible a maximum flow from a given internal area as 11. The latter area can not be reduced but has a diameter of that of the container outlet less twice the thickness of the material employed for the faucet wall. The function sought is to avoid any constriction of the tubing in process of manufacture of the faucet. Obviously, the thinner the material used the larger will be the effective outlet 11 from the container. The next problem is the formation of the valve seat, which in most methods is apt to reduce the area. The formation of the nut part 8 is also difficult to attain without a certain amount of stricture. Both of these steps can be provided for by die-pressing, and at the same time keep the factor of reasonable expense and rapidity of production within proper limits; in fact, die-pressing is more advantageous as to both the above factors than is casting.

My final product, of which a longitudinal section is seen in Fig. 16, results in a faucet in which the internal area at each of the points 7, 8 and 9 is at least as great as at 11. When this is attained, the maximum flow of liquid through 11 is, of course, reached.

While I have recited my preferred method of manufacturing my product, as well as the structure of the final product itself, many alternative methods of construction and resulting products, or parts thereof will suggest themselves which will clearly fall within the purview of my invention. For example, while thus far I have described the formation of the nut portion of the faucet body as accomplished by an outward-pressing operation, the minimum area of the opening at 11 may be attained at 8 by forming the tube as shown in Fig. 6 with a pronounced taper, the lower end of the part 6 being as shown in said view, but the parts 5 and the upper part of 6 being larger than as there shown, so that the nut portion 8 may be die-pressed by inward pressing that will still leave the minimum area at 11. The same operation will provide for sufficiently large opening at 9 and still preserve the seat structure 3.

In some instances it may be desirable to press in the bent portion 9 by a suitable tool from a larger size, so that the inner area at 9 will meet the conditions positively recited above. While the nut portion in Fig. 9 is shown hexagonal, it is evident that any other polygonal form might be used, as the square 12, the inner area 13 being retained of full size. In some cases a fluted portion might be used rather than a polygonal form, in any case the application of a wrench being more positive than on a smooth surface, in fact, any roughened surface would be more or less advantageous.

While I have shown my faucet provided with a plug formed from sheet metal by pressing, and this is my preferred form, I contemplate using other style of plugs with the faucet body shown in Fig. 8, in some cases, cast plugs, hollow or solid may be used.

My form of faucet shown in Fig. 16 may be cast by dies in some instances, or possibly by sand molds, though either of these operations involve difficulties quite insurmountable to get the best results. Any increase in the thickness of material from which the parts are fashioned will of course decrease the inner area at 11 and defeat the object of the invention at the start. This condition alone forbids the use of some materials.

I prefer steel, though other sheet metals as brass, aluminum, copper or bronze, may be used.

Attention is also directed to the fact that while I have been able to use metal sheets but $\frac{1}{16}''$ in thickness, and therefore produce a faucet having a minimum diameter of $\frac{7}{8}''$ on its interior, I have shown the walls of exaggerated thickness for purposes of clearer illustration in Figs. 8, 9, 16 and 17 of the drawings, and consequently the interior of certain parts in said views are slightly smaller than they would be in actual use.

Having thus described my invention, what I claim and desire to secure by Letters Patent is,—

1. The method of making a faucet comprising shaping a thin metallic disc into a cup form, shaping said cup into a hollow product having a large open section and a reduced closed section with an intermediate abrupt valve seat the area of whose smallest bore is no less than that of said closed section, removing the tip of the closed section, forming a plygonal nut portion intermediate the ends of the reduced section, said nut portion having the cross area of its interior no less than that of the smaller end of the tube, and threading the larger and reduced ends of the tube internally and externally, respectively, substantially as set forth.

2. The method of making a tubular faucet comprising subjecting a thin disc of sheet metal to a series of die-pressing operations which effect successively cup forms of different depths until a hollow product is attained having a large open section and a reduced closed section, with an abrupt valve seat therebetween, the area of whose bore is no less than that of said closed section, eliminating the tip of the closed section, die-shaping the walls of the reduced section intermediate its ends to polygonal form, and threading the larger and reduced ends of the tube internally and externally, respectively, substantially as set forth.

3. The method of making a tubular faucet comprising subjecting a thin, flat, circular plate of sheet metal to die-pressing operations which effect from said plate a hollow product having a large open section and a reduced closed section with an abrupt valve seat therebetween, the area of whose bore is no less than that of said closed section, eliminating the tip of the closed section, forming the walls of the reduced section intermediate its ends into polygonal form whose effective bore has an area no less than that of the smallest bore of the remainder of the reduced section, and threading the larger and reduced ends of the tube internally and externally, respectively, substantially as set forth.

4. The method of making a faucet comprising die-pressing a thin disc of sheet metal into cup form, subjecting the cup to a series of reducing and elongating operations, by die-pressing until a hollow product is effected having a large open end and a reduced closed end, eliminating the tip of the closed end, further pressing the tube to produce an abrupt valve seat between the two parts of the tube, punching a nozzle opening in the side wall of the larger end, outwardly pressing and shaping a section of the walls of the reduced end to polygonal form, and threading the ends of the tube, the larger internally and the smaller externally.

5. A faucet having integral walls of thin metal and comprising an inflow section having a nut portion intermediate its ends, an enlarged exit section, an annular bent portion connecting the two sections together and serving as an abrupt valve seat, neither the nut portion nor the bent portion having a smaller bore than that of the inflow section, and a valve plug in threaded engagement with said exit section and adapted to engage said valve seat.

6. A faucet having sheet metal walls and comprising a tubular body portion having means at one end for securing the same within the outlet of a container, a nut portion for engagement by a wrench, a valve portion for control of the flow of liquids therethrough, and an outlet nozzle at the end opposite said securing means, the bore of the nut portion and valve opening and nozzle being each at least as great as that of the end portion within the said container outlet.

7. A faucet having thin metal walls and comprising an inflow section having a portion intermediate its ends for ready application of a wrench, an enlarged exit section, a lateral outflow nozzle protruding from the lateral wall of said exit section, an annular bent portion connecting the two sections together and serving as an abrupt valve seat, neither the wrench engaging portion nor the bent portion having a smaller internal cross area than that of the inflow section, and a valve plug in co-operative engagement with said exit section whereby the plug is made to engage said valve seat.

8. A faucet having integral metal walls and comprising a tubular structure having means at one end for engaging an outlet of a container, and an enlarged outflow end having internal means to engage a valve plug whereby rotation of the latter will advance the same into the outflow end, a valve seat connecting the end parts of the structure, the internal area of no other portion of the tube being less than that of the portion within the said outlet.

9. A faucet having a tubular end exteriorly threaded for engaging the threads of a circular aperture, an enlarged tubular end connected with said threaded end by an abrupt valve seat, and having on its inner surface means to engage the valve plug whereby rotation of the latter will advance the same in said enlarged end, a polygonal nut section being included in said first-mentioned tubular end, the bore of neither the nut nor the seat portions being less than that of the exteriorly threaded end.

In testimony whereof I hereunto affix my signature.

JOHN H. HORSBURGH.